United States Patent
Queener et al.

(10) Patent No.: US 6,343,832 B1
(45) Date of Patent: Feb. 5, 2002

(54) QUICK CHANGE VEHICLE DOOR

(76) Inventors: Lawrence A. Queener, 2031 St. Clair, Highland, MI (US) 48357; Mark Mikolaiczik, 9455 Brookville, Plymouth, MI (US) 48170; Thomas C. Jones, 29492 Lathrup, Southfield, MI (US) 48070

( * ) Notice: Subject to any disclaimer, the term of this patent is extended or adjusted under 35 U.S.C. 154(b) by 0 days.

(21) Appl. No.: 09/686,704

(22) Filed: Oct. 11, 2000

(51) Int. Cl.[7] .................................................. B60J 5/04
(52) U.S. Cl. ..................... 296/202; 296/146.6; 296/148; 296/153
(58) Field of Search .......................... 49/502; 296/146.1, 296/146.2, 146.6, 148, 149, 153, 202

(56) References Cited

U.S. PATENT DOCUMENTS

| | | | | |
|---|---|---|---|---|
| 3,782,036 A | * | 1/1974 | Clark et al. ................ | 49/502 |
| 4,135,759 A | | 1/1979 | Bott et al. ................. | 296/153 |
| 4,328,642 A | * | 5/1982 | Presto ....................... | 49/502 |
| 4,606,148 A | * | 8/1986 | Gandini ..................... | 49/502 |
| 4,702,040 A | * | 10/1987 | Hellriegel .................. | 49/502 |
| 4,850,636 A | * | 7/1989 | McLaren et al. ............ | 296/146.5 |
| 5,072,983 A | | 12/1991 | Muroi et al. ............... | 296/37.13 |
| 5,120,104 A | | 6/1992 | Grimes ...................... | 296/153 |
| 5,127,191 A | * | 7/1992 | Ohta .......................... | 49/62 |
| 5,417,470 A | * | 5/1995 | Holt ........................... | 296/188 |
| 5,573,297 A | * | 11/1996 | DeRees et al. ............. | 296/146.6 |
| 5,906,072 A | * | 5/1999 | Feige et al. ................ | 49/502 |
| 5,906,409 A | * | 5/1999 | DeRees et al. ............. | 296/467 |
| 6,101,765 A | * | 8/2000 | Hashimoto et al. ......... | 49/502 |

FOREIGN PATENT DOCUMENTS

| | | | | |
|---|---|---|---|---|
| GB | 2101535 | * | 1/1983 | ............... 296/202 |
| JP | 406171364 | * | 6/1994 | ............... 296/146.6 |
| JP | 406171366 | * | 6/1994 | ............... 296/146.6 |

* cited by examiner

*Primary Examiner*—Joseph D. Pape
*Assistant Examiner*—Paul Chenevert

(57) ABSTRACT

A quick change vehicle door includes a carrier sub-assembly having at least one hinge and a latch, and a closure sub-assembly having an inner panel and an outer panel detachably received by the carrier sub-assembly.

11 Claims, 3 Drawing Sheets

QUICK CHANGE VEHICLE DOOR

FIELD OF THE INVENTION

The present invention relates to vehicle doors, and more specifically, to a quick change vehicle door.

BACKGROUND OF THE INVENTION

Conventional vehicle doors typically include full outer and inner panels, and full interior trim panels, where assembly of the interior components, such as inner door handles, lock hardware, and the like, is accomplished prior to assembly of the inner door trim panel. However, in cases of service or replacement of these interior components, removal of the full interior trim panel and subsequent realignment is needed. Also, in the case of minor accidents where only slight damage is done to the door, it is often the case that the entire door must be replaced, thus resulting in the expensive subcomponents, which are not damaged, being replaced as well. Therefore, it would be beneficial to have a vehicle door that has a sub-assembly which contains these interior components, and that enables quick service or replacement of door panel outer sub-assemblies, thereby eliminating the need to remove full interior trim panels and realign the door hinges or latch.

It is therefore desired to have a vehicle door that incorporates a feature which allows for outer closure sub-assembly service or replacement without requiring full interior panels and door hinges to be removed and subsequently realigned, thereby saving on time required for service or replacement, as well as saving on part cost of the interior components that need not be removed.

SUMMARY OF THE INVENTION

It is an object of the present invention to provide a quick change vehicle door that overcomes the disadvantages of the prior art.

The present invention advantageously provides a vehicle door including a carrier sub-assembly having at least one hinge and a latch, and a closure sub-assembly having an inner panel and an outer panel detachably received by the carrier sub-assembly.

It is a feature of the present invention that the vehicle door has a carrier sub-assembly which allows for replacement of outer closure sub-assemblies without requiring removal and realignment of door hinges.

BRIEF DESCRIPTION OF THE DRAWINGS

These and other objects, features, and advantages of the present invention will become apparent from a reading of the following detailed description with reference to the accompanying drawings, in which.

DESCRIPTION OF THE PREFERRED EMBODIMENTS(S)

Figure 1:
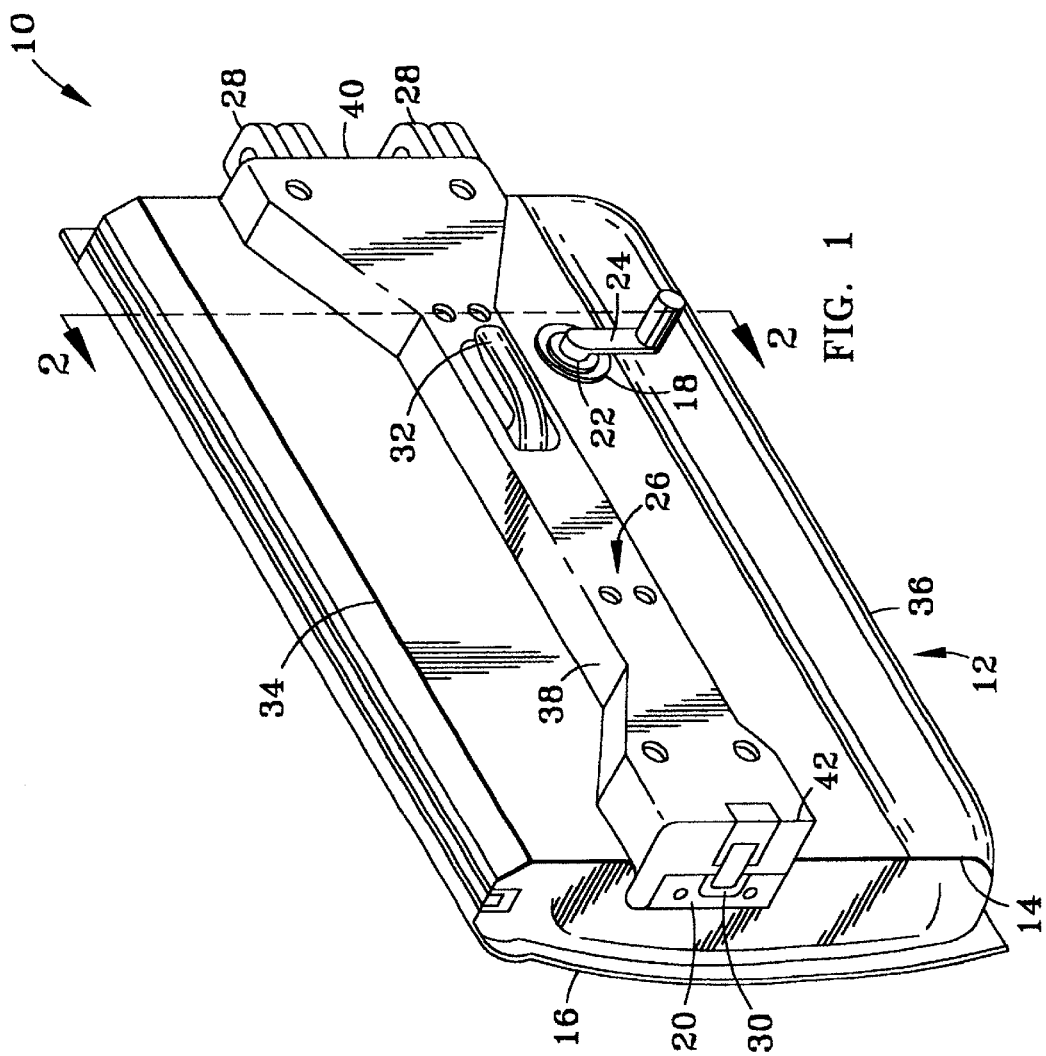
FIG. 1 is a perspective view of the quick change vehicle door according to the present invention.

Referring to FIG. 1, a quick change vehicle door 10 is illustrated. As shown, the door 10 has a closure sub-assembly 12. The closure sub-assembly 12 consists of inner and outer panels 14 and 16, and a window regulator assembly 18. The inner and outer panels 14 and 16 are substantially rectangular in shape, extend the length and height of the door 10, are parallel with each other, and are spaced a predetermined distance apart. Disposed within the closure sub-assembly 12 is the window regulator assembly 18, which has a mounting portion 22 and a window regulator handle 24. The mounting portion 22 of the window regulator assembly 18 is disposed on the inner panel 14 of the closure sub-assembly 12. The window regulator handle 24 is rotatable clockwise and counterclockwise with respect to the mounting portion 22 and is disposed thereon.

As also shown in FIG. 1, the door 10 has a carrier sub-assembly or hinge/latch sub-assembly 26. The carrier sub-assembly 26 consists of an intrusion beam 20, hinges 28, a latch 30, an inner door handle 32, and a lock mechanism (not shown). The carrier sub-assembly 26 is an elongated structural member and extends the length of the door 10. The carrier sub-assembly 26 is disposed a predetermined distance from the top and bottom 34 and 36 of the inner panel 14 of the closure sub-assembly 12, and extends perpendicularly therefrom a predetermined distance thereby creating an operator armrest portion 38. The intrusion beam 20 extends substantially the height and the length of the carrier sub-assembly 26. The hinges 28 are disposed on the front end 40 of the carrier sub-assembly 26. The latch 30 is disposed on the rear end 42 of the carrier sub-assembly 26. The inner door handle 32 is disposed a predetermined distance between the front and rear ends 40 and 42 of the carrier sub-assembly 26. Other subcomponents may be disposed on either the carrier or closure subassembly, 26 and 12 respectively, such as power windows, power locks and speakers for example, without departing from the scope of the present invention.

Figure 2:
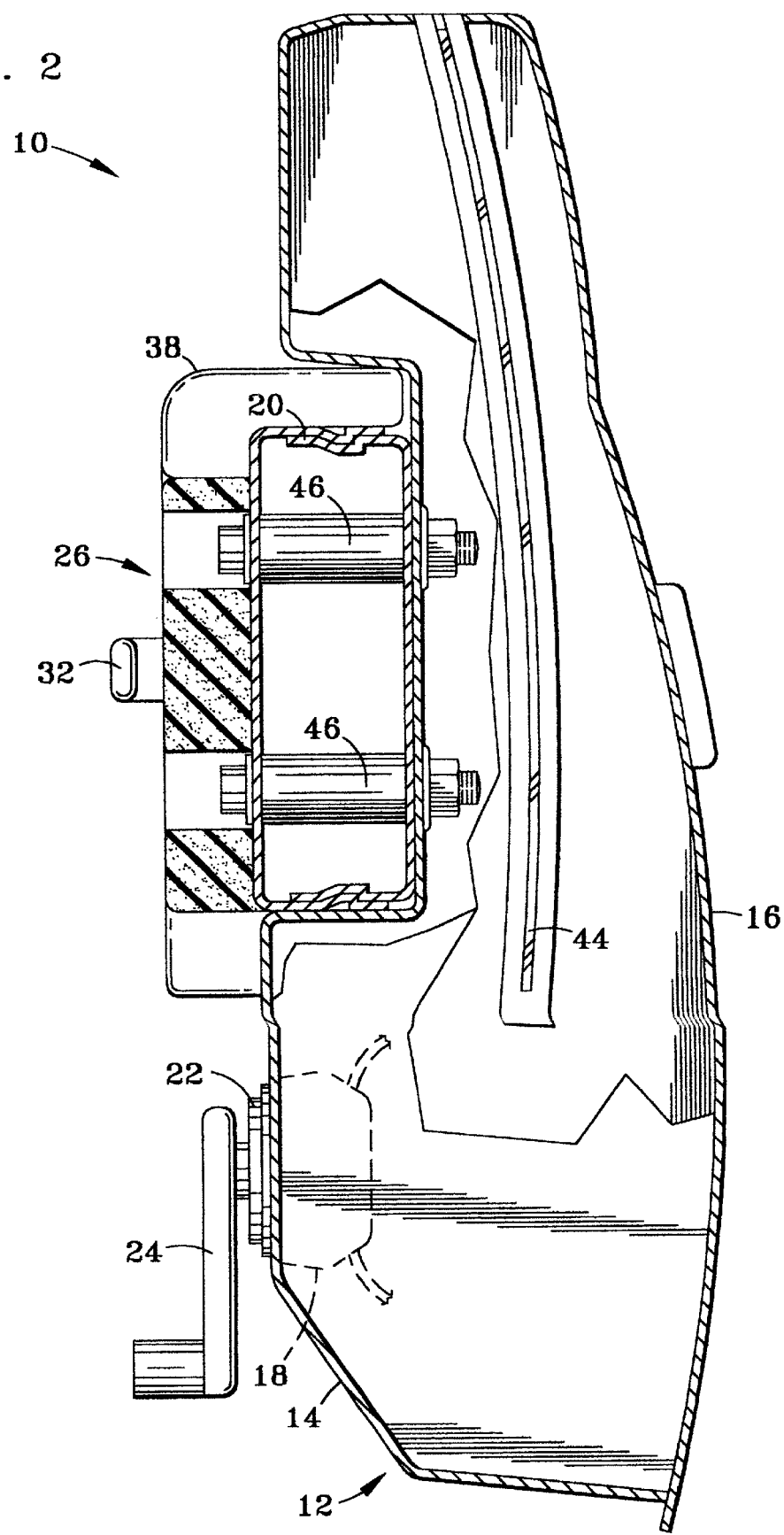
FIG. 2 is a section view taken along line 2—2 of FIG. 1 of the quick change vehicle door according to the present invention.

Referring to FIG. 2, a section view of the door 10 is illustrated. The glass window 44 is disposed intermediate the inner and outer panels 14 and 16 of the closure sub-assembly 12. The window regulator assembly 18 is shown contained in the closure sub-assembly 12. The inner door handle 32 of the carrier sub-assembly 26 is also shown disposed intermediate two fasteners 46, which serve to connect the carrier sub-assembly 26 with the inner panel 14 of the closure sub-assembly 12. Disposed above the intrusion beam 20 of the carrier sub-assembly 26 is a foam portion that serves as the operator armrest 38.

Figure 3:
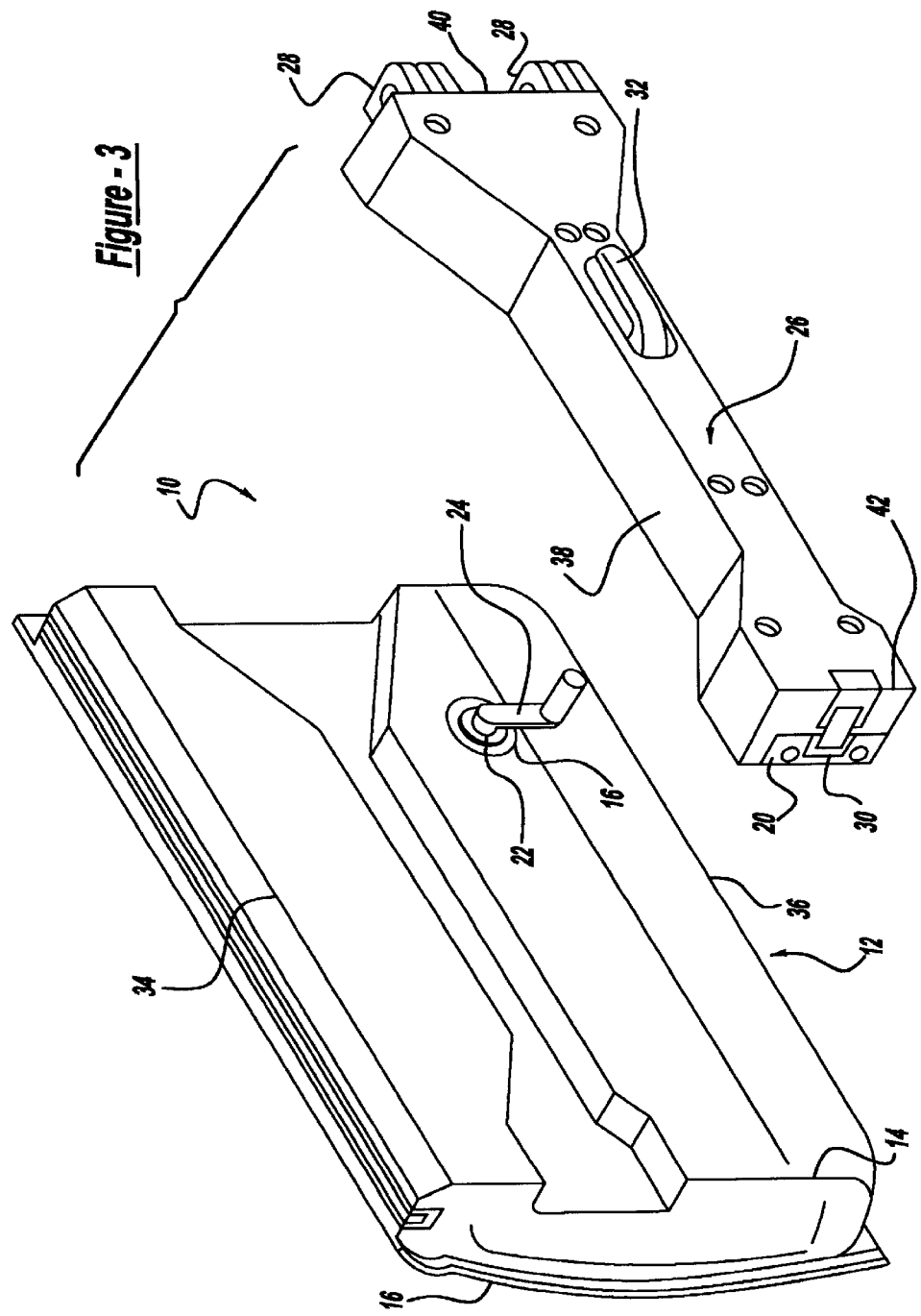
FIG. 3 is a perspective view of the quick change vehicle door of FIG. 1 showing the carrier sub-assembly separated from the closure sub-assembly.

Because the door hinges 28, the latch 30, the intrusion beam 20, the inner door handle 32, and the lock hardware are all contained in the carrier sub-assembly 26, parts of the closure sub-assembly 12 are easily replaced without requiring the removal of the door hinges 28 and subsequently realigning the door 10, as can best be seen in FIG. 3.

While only one embodiment of the quick change vehicle door of the present invention has been described, others may be possible without departing from the scope of the following claims.

What is claimed is:

1. A vehicle door comprising:
   a carrier sub-assembly having at least one hinge, a latch, and a surface area a predetermined portion of which is exposed to the passenger space of the vehicle; and
   a closure sub-assembly having an inner panel and an outer panel, and wherein the closure sub-assembly is detachably received by the carrier sub-assembly.

2. The vehicle door as claimed in claim 1, wherein the carrier sub-assembly further includes an intrusion beam.

3. The vehicle door as claimed in claim 2, wherein the intrusion beam runs substantially the length of the carrier sub-assembly.

4. The vehicle door as claimed in claim 1, wherein the carrier sub-assembly further includes an armrest.

5. The vehicle door as claimed in claim 1, wherein the carrier sub-assembly further includes an inner door handle.

6. A vehicle door comprising:

a carrier sub-assembly having at least one hinge, a latch, and a surface area a predetermined portion of which is exposed to the passenger space of the vehicle; and a closure sub-assembly having an inner panel, an outer panel, and a window regulator assembly, and wherein the closure sub-assembly is detachably received by the carrier sub-assembly.

7. The vehicle door as claimed in claim 6, wherein the carrier sub-assembly further includes an intrusion beam.

8. The vehicle door as claimed in claim 7, wherein the intrusion beam runs substantially the length of the carrier sub-assembly.

9. The vehicle door as claimed in claim 6, wherein the carrier sub-assembly further includes an armrest.

10. The vehicle door as claimed in claim 6, wherein the carrier sub-assembly further includes an inner door handle.

11. A vehicle door comprising:

a carrier sub-assembly having at least one hinge, a latch, an intrusion beam, an armrest, an inner door handle, and a surface area a predetermined portion of which is exposed to the passenger space of the vehicle; and a closure sub-assembly having an inner panel, an outer panel, and a window regulator assembly, and wherein the closure sub-assembly is detachably received by the carrier sub-assembly.

* * * * *